(12) United States Patent
Gralka et al.

(10) Patent No.: US 11,453,180 B2
(45) Date of Patent: Sep. 27, 2022

(54) FIBER COMPOSITE MEMBER AND METHOD FOR PRODUCING A FIBER COMPOSITE MEMBER

(71) Applicant: Bayerische Motoren Werke Aktiengesellschaft, Munich (DE)

(72) Inventors: Richard Gralka, Gotha (DE); Thomas Hogger, Otterfing (DE); Falco Hollmann, Garching (DE); Michael Kleinknecht, Munich (DE); Bernhard Staudt, Munich (DE); Ingo Steinke, Breitenbrunn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 150 days.

(21) Appl. No.: 16/885,097

(22) Filed: May 27, 2020

(65) Prior Publication Data
US 2020/0282665 A1 Sep. 10, 2020

Related U.S. Application Data

(63) Continuation of application No. PCT/EP2018/075879, filed on Sep. 25, 2018.

(30) Foreign Application Priority Data

Nov. 28, 2017 (DE) ..................... 10 2017 221 235.7

(51) Int. Cl.
*F16C 7/02* (2006.01)
*B29C 70/32* (2006.01)
(Continued)

(52) U.S. Cl.
CPC ............ *B29C 70/222* (2013.01); *B29C 70/24* (2013.01); *B29C 70/32* (2013.01); *B29C 70/70* (2013.01); *F16C 7/026* (2013.01)

(58) Field of Classification Search
None
See application file for complete search history.

(56) References Cited

U.S. PATENT DOCUMENTS

| 4,255,087 A | * | 3/1981 | Wackerle | ................ B64C 27/46 416/134 A |
| 4,353,267 A | * | 10/1982 | Robert | .................. B29C 53/564 74/579 R |

(Continued)

FOREIGN PATENT DOCUMENTS

| BR | 9005454 A | 3/1991 |
| CN | 105431645 A | 3/2016 |

(Continued)

OTHER PUBLICATIONS

English-language Chinese Office Action issued in Chinese application No. 201880067074.3 dated Sep. 3, 2021 (Seven (7) pages).

(Continued)

*Primary Examiner* — Jeffry H Aftergut
(74) *Attorney, Agent, or Firm* — Crowell & Moring LLP

(57) ABSTRACT

A fiber composite member includes an elongate main member and a fastening portion disposed at an end of the elongate main member, the fastening portion has a fastening opening for fastening the fiber composite member to a neighboring part. A reinforcement fiber bundle, which forms a fiber reinforcement of both the elongate main member and the fastening portion, has a first reinforcement fiber and a second reinforcement fiber which run substantially mutually parallel in a region of the elongate main member. A respective part of the first reinforcement fiber and the second reinforcement fiber in a transition region between the elongate main member and the fastening portion depart from a bundle profile in the region of the elongate main member (Continued)

and the respective parts of the first and second reinforcement fibers intersect with one another in the transition region.

7 Claims, 3 Drawing Sheets

(51) Int. Cl.
*B29C 70/22* (2006.01)
*B29C 70/24* (2006.01)
*B29C 70/70* (2006.01)

(56) References Cited

U.S. PATENT DOCUMENTS

2013/0129956 A1 5/2013 Valembois
2017/0130764 A1 5/2017 Yasui

FOREIGN PATENT DOCUMENTS

| DE | 101 53 875 A1 | 5/2003 |
|----|---|---|
| DE | 10 2010 053 850 A1 | 6/2012 |
| DE | 10 2013 007 284 A1 | 10/2014 |
| EP | 0 019 494 A1 | 11/1980 |
| EP | 0 668 446 A1 | 8/1995 |
| EP | 1 308 265 A1 | 5/2003 |
| EP | 3 053 734 A1 | 8/2016 |
| FR | 2 452 630 A1 | 10/1980 |

OTHER PUBLICATIONS

PCT/EP2018/075679, International Search Report dated Dec. 19, 2018 (Two (2) pages).
German Search Report issued in German application No. 10 2017 221 235.7 dated Mar. 19, 2018, (Seven (7) pages).

* cited by examiner ized as 2017 221 235.7, filed Nov. 28, 2017, the entire disclosures of which are herein expressly incorporated by reference.

FIBER COMPOSITE MEMBER AND METHOD FOR PRODUCING A FIBER COMPOSITE MEMBER

CROSS REFERENCE TO RELATED APPLICATIONS

This application is a continuation of PCT International Application No. PCT/EP2018/075879, filed Sep. 25, 2018, which claims priority under 35 U.S.C. § 119 from German Patent Application No. 10 2017 221 235.7, filed Nov. 28, 2017, the entire disclosures of which are herein expressly incorporated by reference.

BACKGROUND AND SUMMARY OF THE INVENTION

The invention relates to a preferably elongate fiber composite member, in particular a strut, having a main member which is in particular elongate, and at least one fastening portion which for fastening the fiber composite member to a neighboring part has a fastening opening, wherein a reinforcement fiber bundle, which forms the fiber reinforcement of both the main member as well as of the fastening portion, and the reinforcement fibers thereof in the region of the main member in the longitudinal direction of the main member run so as to be substantially mutually parallel, is provided. The invention furthermore relates to a method for producing an elongate fiber composite member, in particular a strut, having an in particular elongate main member and at least one fastening portion which has a fastening opening.

A generic fiber composite member is known from DE 10 2010 053 850 A1 and serves as a reinforcement strut for a motor vehicle body, which is used as a diagonal strut on the underbody of the vehicle, in particular of a convertible, in order for the stiffness of the body to be increased. The reinforcement strut described in DE 10 2010 053 850 A1 on both ends has a passage opening around which the reinforcement fibers which otherwise ran unidirectionally in the direction of load of the strut are guided, and represents a lighter alternative to known diagonal struts from metal.

It is therefore an object of the invention to provide a fiber composite member as well as a method for producing a fiber composite member which is distinguished by light weight, cost-effective manufacturing, as well as improved stability.

To this end, it is provided according to the invention in a fiber composite member of the type mentioned at the outset that at least part of the reinforcement fibers in a transition region between the main member and the fastening portion depart from the bundle profile and intersect with other reinforcement fibers. While the reinforcement fibers in the region of the main member run in the direction of load (in the case of an elongate main member along the longitudinal axis thereof), some of the reinforcement fibers in the transition region toward the fastening portion (and thus ahead of the fastening opening, when viewed from the main member) are crossed with one another, on account of which the stability of the fiber composite member according to the invention is increased. The fiber composite member is in particular capable of being stressed not only for tension but also very much so for compression. The fiber composite member according to the invention herein is distinguished by the significantly lower weight thereof in comparison to usual struts from aluminum or steel.

The fiber composite member according to the invention and the main member are preferably elongate.

According to one preferred embodiment, the reinforcement fiber bundle is generated by wrapping. On account thereof, apart from a significantly more cost-effective production process, a saving in terms of weight also results in comparison to struts from fiber composite material having braided reinforcement fibers.

The fastening portion is in particular configured so as to be integral to the main member, on account of which a particularly stable component which is easy to manufacture is achieved.

In one preferred design embodiment, the fastening portion is an end portion; in particular two opposite end portions are provided. The end portions serve for fastening the fiber composite member to a neighboring part, for example to a vehicle body or to another strut.

In one refinement of the invention, the crossing points of the reinforcement fibers for further increasing the stability are compressed, in particular by curing the fiber composite member in a mold.

In one preferred embodiment, at least the fastening portion has an insert around which the reinforcement fibers are guided. Such an insert, which is preferably made from plastics material, facilitates guiding of the fibers when wrapping the reinforcement fiber bundle since the reinforcement fibers without corresponding guiding tend to run in a rectilinear manner. The reinforcement fibers herein surround the insert in particular in a loop-shaped manner.

As an alternative to using an insert which remains in the completed fiber composite member, a correspondingly embodied wrapping device which possesses fiber guiding elements or "wrapping aids", respectively, is conceivable so as to achieve the desired fiber profile when wrapping the reinforcement fiber bundle.

In one refinement of the invention, the insert has at least one clearance through which the intersecting reinforcement fibers extend, wherein the reinforcement fibers intersect in the clearance per se. In this way, the insert forms a guide for the reinforcement fibers in the crossing region.

In one preferred design embodiment, the insert has a sleeve portion which surrounds the fastening opening and is in particular provided with two lateral delimitation disks. The reinforcement fibers are at least in part guided around the sleeve portion, wherein the lateral delimitation disks facilitate the wrapping, since the delimitation disks prevent the reinforcement fibers from laterally slipping from the sleeve portion.

The insert can furthermore have a mandrel portion which is contiguous to the sleeve portion and points in the direction of the main member, part of the reinforcement fibers mutually intersecting in the region of the mandrel portion. The mandrel portion thus serves as a guide for the reinforcement fibers, in particular in the crossing region.

In one particularly preferred design embodiment, the mandrel portion has at least one pin-type appendage which is disposed on the main-member end of the mandrel portion and divides part of the reinforcement fibers into two mutually intersecting groups. Two appendages on both sides of the mandrel portion are preferably provided herein, wherein reinforcement fibers mutually intersect on both sides of the mandrel portion in this instance, this increasing the stability.

The at least one pin-type appendage preferably extends perpendicularly to the longitudinal direction of the main member and thus to the direction of main extent of the reinforcement fibers. The pin-type appendage thus serves as a guiding or dividing element, respectively, for the reinforcement fibers, this facilitating the wrapping of a reinforcement fiber bundle having crossing fibers.

The object set forth above is likewise achieved by a method of the type mentioned at the outset which comprises the following steps:

a) wrapping a reinforcement fiber bundle, the reinforcement fibers thereof in the region of the main member running in the longitudinal direction of the main member;

b) crossing at least part of the reinforcement fibers of the reinforcement fiber bundle in a transition region between the main member and the fastening portion;

c) embedding the reinforcement fiber bundle in a plastics-material matrix; and d) curing the plastics-material matrix.

The method steps a) and b) herein, specifically the wrapping of the reinforcement fiber bundle and the crossing of part of the reinforcement fibers, preferably take place simultaneously, that is to say that part of the reinforcement fibers are crossed directly when wrapping the reinforcement fiber bundle.

A fiber composite member which apart from a high tensile load bearing capability can also very much be stressed for compression can be produced by the method according to the invention. An increased stability of the fiber composite member, specifically in the fastening region or around the fastening opening, respectively, is achieved by crossing the fibers ahead of the fastening opening. Moreover, very light and cost-effective struts are achieved by the method according to the invention.

In one refinement of the method according to the invention, the crossing points of the reinforcement fibers are compressed, in particular by curing the fiber composite member in a mold. The stability of the components generated can thus be even further increased.

In one preferred design embodiment, an insert is disposed at least in the region of the fastening portion, the reinforcement fibers when wrapping being guided around the insert, and part of the reinforcement fibers being crossed with the aid of the insert. To this end, the insert can in particular have a clearance through which the intersecting reinforcement fibers extend, and in the interior of which the reinforcement fibers cross. The insert thus facilitates the wrapping of the fibers in the crossing region, since the reinforcement fibers without corresponding guiding tend to run in a rectilinear manner.

Moreover, all of the refinements and advantages mentioned in the context of the fiber composite member according to the invention also apply to the method according to the invention, and vice versa.

Further features and advantages are derived from the description hereunder of preferred embodiment by means of the appended drawings.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
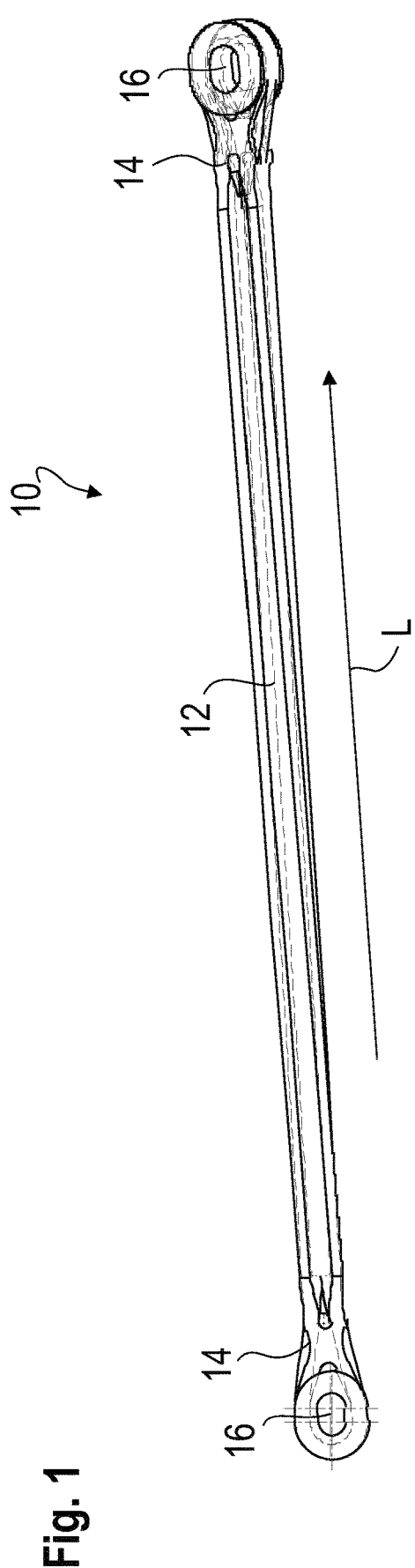
FIG. 1 shows a plan view of an elongate fiber composite member according to the invention.
Figure 2:
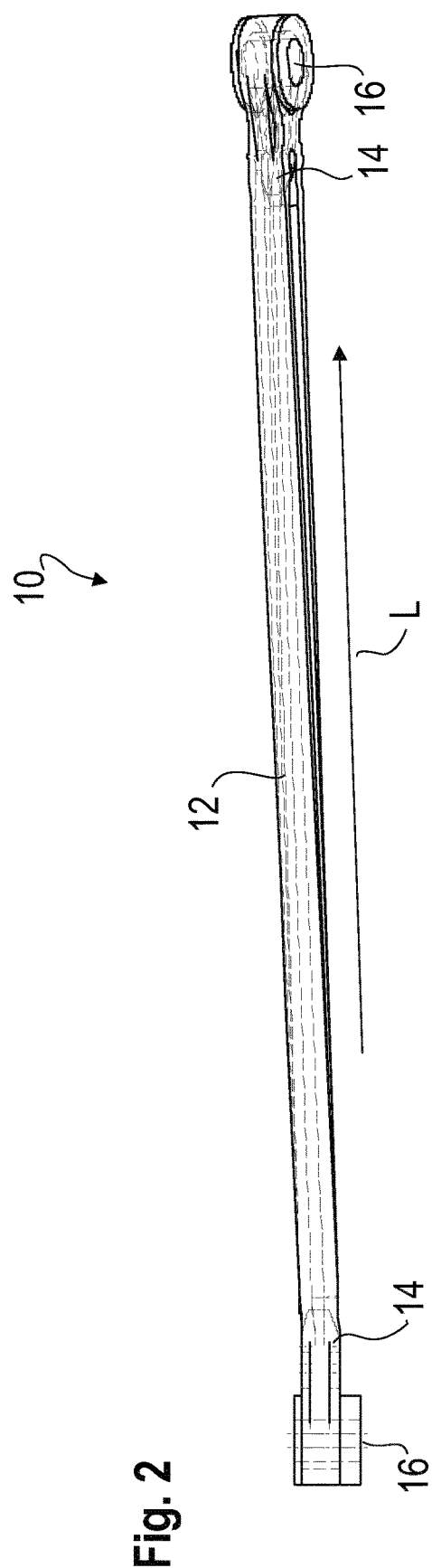
FIG. 2 shows a lateral view of the fiber composite member from FIG. 1.

FIGS. 1 to 4 show an elongate fiber composite member 10 according to the invention, in the form of a strut, which is used in particular in the automotive sector, for example for reinforcing a body. The fiber composite member 10 has an elongate main member 12 as well as two fastening portions 14 which are configured so as to be integral to the main member 12 and which are opposite end portions. Each of the fastening portions 14 has one fastening opening 16 and serves for fastening the fiber composite member 10 to a neighboring part, for example by way of a screw not shown in the Figures.

The fiber composite member 10 has a common fiber reinforcement of the main member 12 and of both fastening portions 14 in the form of a reinforcement fiber bundle 18 which is generated by wrapping and is embedded in a plastics-material matrix 20. The reinforcement fibers 22 of the reinforcement fiber bundle 18 in the region of the main member 12 run so as to be substantially mutually parallel in the longitudinal direction L of the main member 12, as can be derived in particular from FIG. 3.

An insert 24 which is prefabricated from plastics material and around which the reinforcement fibers 22 are guided in a substantially loop-shaped manner is in each case provided in the region of the fastening portions 14, the insert 24 being conjointly embedded in the plastics-material matrix 20.

Figure 4:
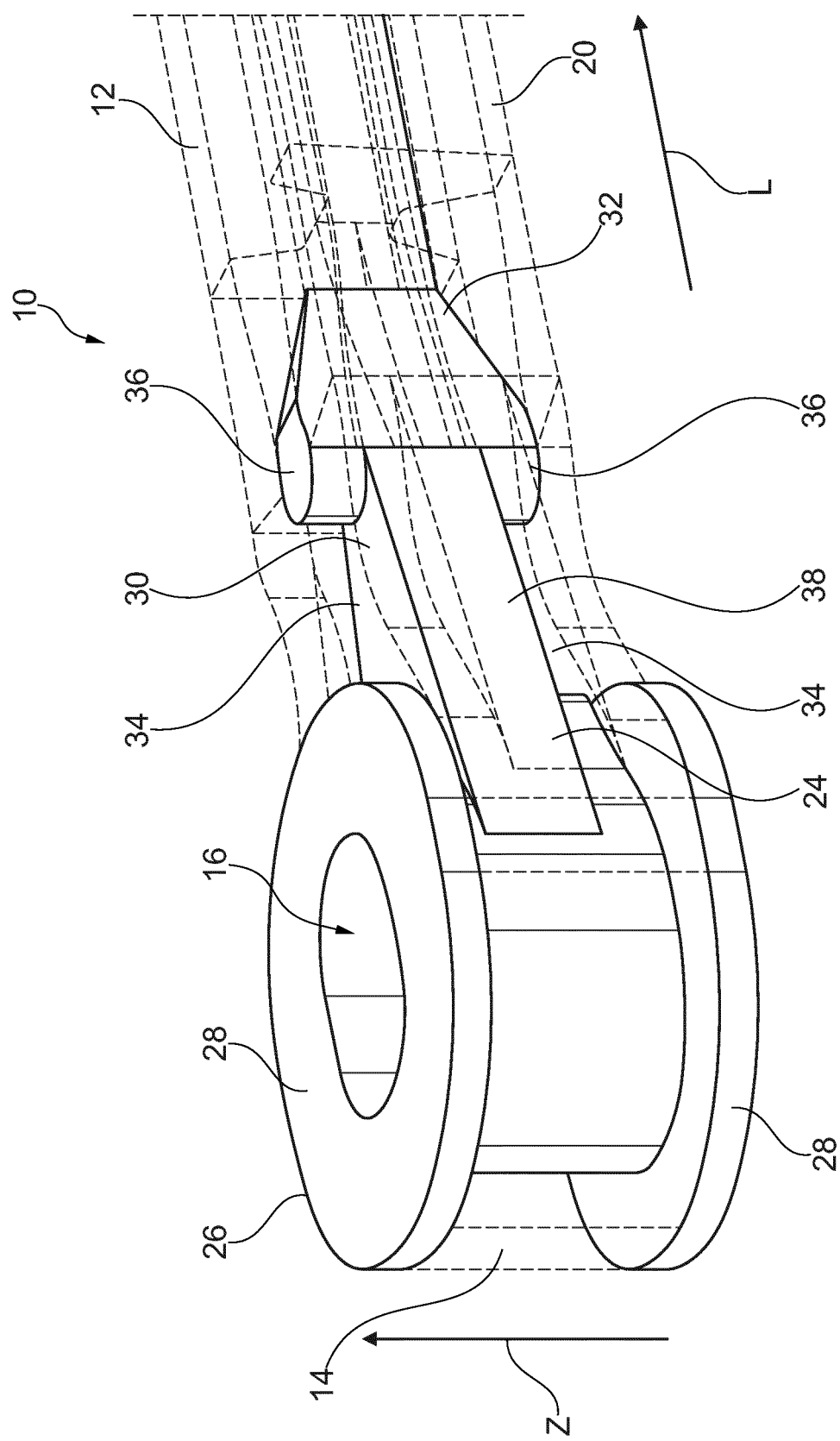
FIG. 4 shows a perspective view of the fastening portion from FIG. 3.

The insert 24 has a sleeve portion 26 which surrounds the fastening opening 16 and, similar to a yarn spool, is provided with two lateral delimitation disks 28 (see in particular FIG. 4). The reinforcement fibers 22 run around the sleeve portion 26.

It is to be noted here that the fiber-reinforced plastics material of the fiber composite member 10 in FIG. 4 has been illustrated so as to be transparent for reasons of clarity.

A mandrel portion 30 which points in the direction of the main member 12, and by way of the tip 32 thereof extends into the main member 12, is contiguous to the sleeve portion 26. The insert 24 in the region of the mandrel portion 30 has two clearances 34 which in the vertical direction Z of the fiber composite member 10 are disposed on both sides of the mandrel portion 30. Part of the reinforcement fibers 22 of the reinforcement fiber bundle 18 mutually intersecting in each case in the interior of the clearances 34. To this end, part of the reinforcement fibers, identified by 22a, departs from the bundle profile and intersects with other reinforcement fibers 22b which likewise depart from the bundle profile.

Figure 3:
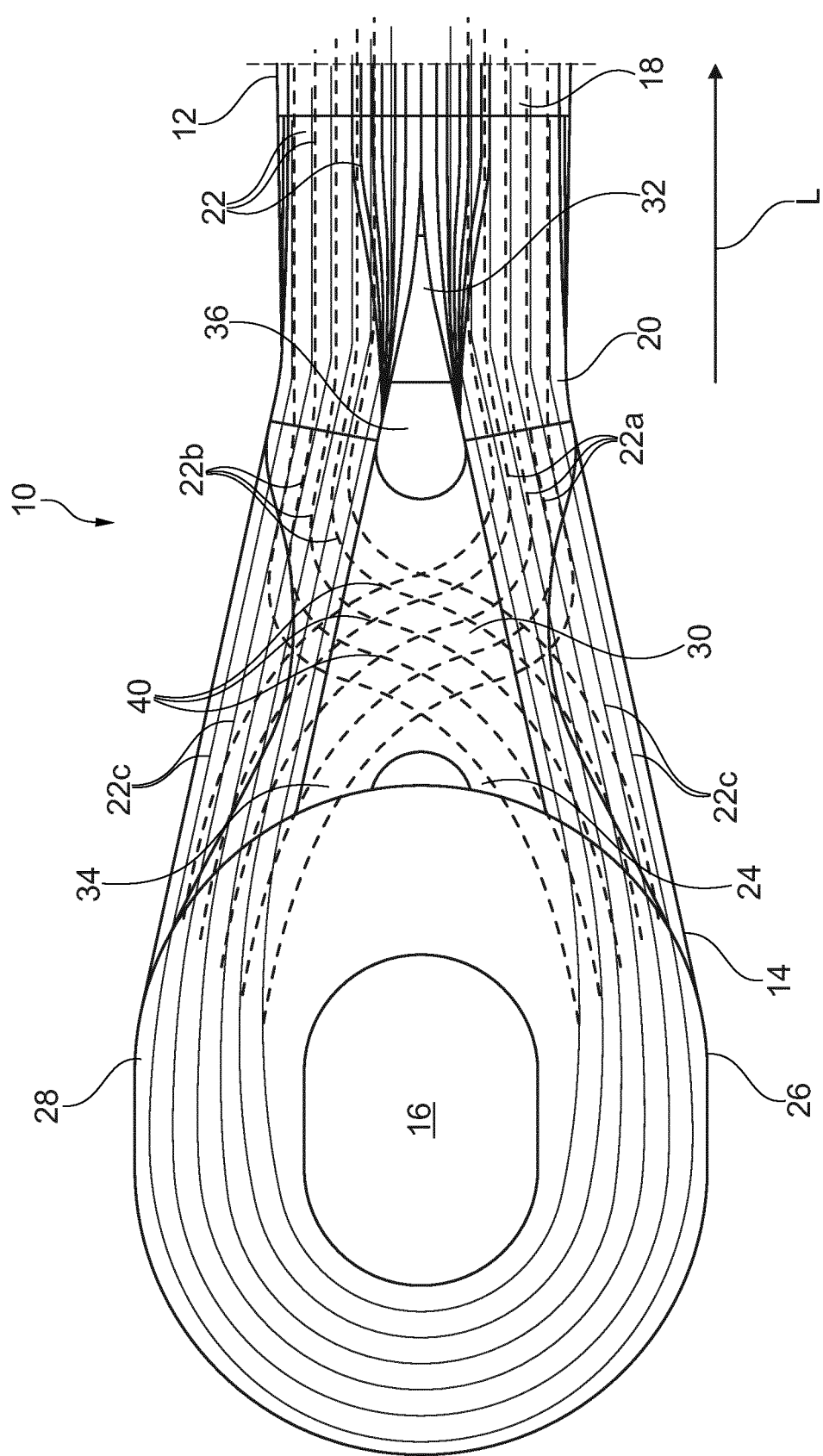
FIG. 3 shows an enlarged illustration of a fastening portion of the fiber composite member from FIG. 1, the illustration highlighting the profile of the reinforcement fibers.

The clearances 34 herein are delimited by the sleeve portion 26, on the one hand, and by two pin-type appendages 36 which are disposed on the main-member side end of the mandrel portion 30, close to the tip 32, and which extend in the vertical direction Z (and thus perpendicularly to the longitudinal direction L of the main member 12). The pin-type appendages 36 dividing in each case part of the reinforcement fibers 22 into the two groups 22a and 22b which mutually intersect. Moreover, some reinforcement fibers 22c run laterally along a central region 38 of the mandrel portion 30, without intersecting other reinforcement fibers, between the planes of the intersecting reinforcement fibers 22a and 22b. Of course, non-crossing reinforcement fibers 22c can also be provided beside as well as above and below the intersecting reinforcement fibers 22a, 22b. For improved clarity, the intersecting reinforcement fibers 22a, 22b in FIG. 3 are illustrated in dashed lines, while the non-crossing reinforcement fibers 22c are indicated by solid lines.

The crossing points 40 of the reinforcement fibers 22a, 22b that lie in the region of the clearance 34 are compressed, specifically by curing the fiber composite member 10 in a mold.

In order for the fiber composite member 10 to be produced, the reinforcement fiber bundle 18 is first wrapped, wherein the reinforcement fibers 22 in the region of the main member 12 run in the longitudinal direction L of the main member 12, and the parts 22a, 22b of the reinforcement fibers of the reinforcement fiber bundle 18 are crossed in the transition region between the main member 12 and the fastening portion 14, more specifically in the clearances 34 of the insert 24, while a further part 22c of the reinforcement fibers is guided without crossing laterally along the insert 24.

The reinforcement fiber bundle 18 thus wrapped is embedded in the plastics-material matrix 20, and the latter is cured. In order for an even higher stability to be achieved, the crossing points 40 of the reinforcement fibers 22 are compressed, preferably by curing the fiber composite member 10 in a mold.

The insert 24, and in particular the clearances 34, as well as the pin-type appendages 36 serve for guiding the reinforcement fibers 22 and for generating the crossing points 40 when wrapping the reinforcement fiber bundle 18.

As an alternative to the shown design embodiment having the insert 24 which is of course likewise present in the second fastening portion 14 not shown in FIGS. 3 and 4, and a corresponding wrapping device which has corresponding "wrapping aids" (for example in the form of pins) which enabled the desired fiber profile of the reinforcement fibers 22 can also be used. In this case, the wrapped reinforcement fiber bundle 18 is transferred to a mold and cured therein, wherein the wrapping aid has however been removed prior thereto. Wrapping herein preferably takes place with pre-impregnated reinforcement fibers.

The fiber composite member 10 according to the invention is distinguished by high stability, is significantly lighter than struts from steel or aluminum, and is significantly more cost effective in production as compared to fiber composite members having braided reinforcement fibers.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fiber composite member, comprising:
    an elongate main member;
    a fastening portion disposed at an end of the elongate main member, wherein the fastening portion has a fastening opening for fastening the fiber composite member to a neighboring part;
    a reinforcement fiber bundle, which forms a fiber reinforcement of both the elongate main member and the fastening portion, has a first reinforcement fiber and a second reinforcement fiber which run substantially mutually parallel in a region of the elongate main member;
    an insert disposed in a region of the fastening portion, wherein the insert has a sleeve portion which surrounds the fastening opening; and
    a mandrel portion, which points in a direction of the elongate main member, is contiguous to the sleeve portion;
    wherein the insert in a region of the mandrel portion has two clearances which in a vertical direction of the fiber composite member are disposed on both sides of the mandrel portion, wherein the two clearances are delimited on a first side by the sleeve portion and on a second side by two pin-type appendages which are disposed on an elongate main member side end of the mandrel portion and which extend in the vertical direction, wherein a respective part of the first reinforcement fiber and the second reinforcement fiber depart from a bundle profile and are divided by the two pin-type appendages and wherein the respective parts of the first and second reinforcement fibers intersect with one another in an interior of the two clearances of the insert.

2. The fiber composite member according to claim 1, wherein the reinforcement fiber bundle is generated by wrapping.

3. The fiber composite member according to claim 1, wherein the fastening portion is integral to the elongate main member.

4. The fiber composite member according to claim 1, wherein the fastening portion is an end portion of the fiber composite member.

5. The fiber composite member according to claim 1, wherein a crossing point of the first and second reinforcement fibers is compressed.

6. A method for producing the fiber composite member according to claim 1, comprising the acts of:
    a) wrapping the first and the second reinforcement fibers of the reinforcement fiber bundle in the region of the elongate main member running in a longitudinal direction of the elongate main member;
    b) crossing the respective parts of the first and the second reinforcement fibers of the reinforcement fiber bundle with one another in the interior of the two clearances of the insert;
    c) embedding the reinforcement fiber bundle in a plastics-material matrix; and
    d) curing the plastics-material matrix.

7. The method according to claim 6, wherein a crossing point of the respective parts of the reinforcement fibers are compressed by curing the fiber composite member in a mold.

* * * * *